US006655436B1

(12) United States Patent
Venditti et al.

(10) Patent No.: US 6,655,436 B1
(45) Date of Patent: Dec. 2, 2003

(54) APPARATUS AND METHOD FOR LABELING A LAYUP OF SHEET MATERIAL

(75) Inventors: Jay Venditti, East Lyme, CT (US); Robert Murphy, Wethersfield, CT (US); Stephen McCarthy, Andover, CT (US); Michael T. Silva, Enfield, CT (US)

(73) Assignee: Gerber Technology, Inc., Tolland, CT (US)

( * ) Notice: Subject to any disclaimer, the term of this patent is extended or adjusted under 35 U.S.C. 154(b) by 0 days.

(21) Appl. No.: 09/579,688

(22) Filed: May 26, 2000

(51) Int. Cl.[7] ........................ B30B 15/00; B32B 31/18; B26D 5/08; B26D 5/26; G05G 15/00

(52) U.S. Cl. ...................... 156/540; 156/542; 156/580; 156/581; 156/355; 156/384; 156/350; 156/DIG. 2; 156/DIG. 19; 156/DIG. 28; 156/DIG. 33; 156/DIG. 42; 156/DIG. 47; 83/76.1; 83/76.6

(58) Field of Search ................................ 156/350, 355, 156/384, 387, 510, 538, 546, 541, 542, 543, 580, 581, 347, DIG. 2, DIG. 8, DIG. 18, DIG. 20, DIG. 28, DIG. 33, DIG. 42, DIG. 47; 83/76.1, 76.6, 227; 101/288

(56) References Cited

U.S. PATENT DOCUMENTS

| | | | | |
|---|---|---|---|---|
| 4,025,382 A | * 5/1977 | Del Rosso | 156/497 |
| 4,124,436 A | * 11/1978 | Pettis, Jr. et al. | 156/542 |
| 4,189,337 A | 2/1980 | Higgins | 156/351 |
| 4,210,484 A | * 7/1980 | Crankshaw et al. | 156/542 |
| 4,514,246 A | 4/1985 | Forrer | 156/264 |
| 4,561,921 A | * 12/1985 | Treiber | 156/297 |
| 4,595,447 A | * 6/1986 | Lindstrom | 156/364 |
| 4,725,327 A | * 2/1988 | Matuda et al. | 156/351 |
| 5,304,264 A | * 4/1994 | Wehrmann | 156/64 |
| 5,549,783 A | * 8/1996 | Schroeder et al. | 156/542 |
| 5,938,890 A | * 8/1999 | Schlinkmann et al. | 156/541 |
| 6,009,926 A | * 1/2000 | Vicktorius et al. | 156/556 |
| 6,080,250 A | * 6/2000 | Urban et al. | 156/64 |
| 6,273,170 B1 | * 8/2001 | Finn et al. | 156/542 |
| 6,308,602 B1 | * 10/2001 | Gerber | 83/76.6 |

FOREIGN PATENT DOCUMENTS

| | | | | |
|---|---|---|---|---|
| EP | 0 460 281 A1 | 12/1991 | |
| EP | 0 911 263 A2 | 4/1999 | |
| GB | 2 297 682 A | 8/1996 | |
| GB | 2297682 A | * 8/1996 | A41H/43/00 |

* cited by examiner

*Primary Examiner*—Jerry A. Lorengo
(74) *Attorney, Agent, or Firm*—McCormick, Paulding & Huber LLP

(57) ABSTRACT

A labeling head includes a printing unit and an applicator foot assembly for printing and applying labels onto a layup of material. The printing unit is integral to the labeling head and prints each label prior to applying the label to the layup. The applicator foot assembly transfers the printed label onto the layup. The labeling head of the present invention can be used either with a cutter, a spreader or as a standalone unit. The labeling head of the present invention prints and prepares labels while the cutter head cuts the part. Once the part is cut, the labeling head applies the prepared label onto the cut part. The labeling head also includes a layup height sensor allowing the labels to be applied to layup having varying heights.

16 Claims, 9 Drawing Sheets

APPARATUS AND METHOD FOR LABELING A LAYUP OF SHEET MATERIAL

BACKGROUND OF THE INVENTION

1. Technical Field

The present invention relates to an apparatus and method for cutting and labeling a layup of sheet material and, more particularly, to an automated labeling apparatus placing identification labels onto the layup.

2. Background Art

A process for fabricating cloth products from web material includes a number of steps and utilizes complicated machinery. First, the web material is spread on a spreader table by a spreading machine. The cloth is typically spread one layer at a time to form a stack or a layup having a certain width and height. Frequently, it is advantageous to have a single layup with varying heights. The stack is then cut into parts according to a marker or a nest that outlines the shapes of the parts. The marker can also include parts that have either the same or different shapes. However, the individual parts in each layer will have the same shape as the part in the layer above or below. The cut parts are then sewn together at a later time.

Frequently, the layup includes similar parts for the same article of clothing, but in different sizes. It is difficult to visually distinguish parts that are only one or two sizes apart. Therefore, it is desirable to label each stack of parts. These labels typically include information regarding part name, description, and size as well as model identification, and name.

The goal of the process is to produce a given quantity of parts to a given quality standard. For example, the final product quality would be negatively impacted if the parts were not properly labeled and used interchangeably during the sewing process. Therefore, it is necessary to ensure that the layup is properly labeled. However, to optimize efficiency and to produce a desired quantity of parts, it is critical to shorten the time each layup spends on the spreader and cutter tables. Therefore, it is necessary to minimize time spent labeling the layup.

Although there are a number of patents disclosing labeling apparatus, none satisfy the necessary requirements. For example, U.S. Pat. No. 5,230,765 entitled "Automated Labeling Apparatus" and issued to Weiselfish et al. describes a labeling apparatus that does not print labels simultaneously with labeling operation. Rather, the Weiselfish apparatus has a separate printer and multiple labeling heads that must return to the printer for additional labels during the labeling operation. The Weiselfish labeling apparatus does not provide an efficient method for labeling a layup.

Another U.S. Pat. No. 5,171,572 entitled "Labeling Apparatus and Method for a Sheet Material Cutting System and a Supply of Labels for Use Therewith", issued to H. Joseph Gerber and assigned to a common assignee herewith also discloses a labeling apparatus. However, the disclosed labeling apparatus uses a preprinted set of labels and does not yield desired efficiency.

Therefore, it is desirable to provide a labeling apparatus that is efficient and meets desired quality standards.

SUMMARY OF THE INVENTION

It is an object of the present invention to provide a labeling apparatus for labeling a layup of material that optimizes labeling process.

It is another object of the present invention to provide a labeling apparatus that minimizes time required for labeling operation.

It is a further object of the present invention to provide a labeling apparatus that accommodates a layup with varying heights.

It is another object of the present invention, to provide a labeling apparatus that ensures that the label was in fact applied to the layup.

According to the present invention, a labeling head, movably attached to a cutter beam, a spreader beam, or to a standalone structure for providing labels to a layup, includes a printing unit for printing each label and an applicator foot assembly for transferring the printed label onto the layup. The labeling head of the present invention can be mounted either on the cutter, on the spreader or be used as a standalone unit. When the labeling head is mounted on the cutter, the labeling head prepares the label while a cutter head is cutting a particular part. Once the cutter head completes cutting the part, the labeling head is moved to the part with the label ready to be applied onto the cut part. Additionally, the labeling head can label parts randomly to optimize the overall cutting and labeling process. The versatility of the labeling head of the present invention allows optimization of the labeling process for each particular job. Additionally, printing and preparing labels while the part is being cut saves time and increases efficiency. Furthermore, integral printing unit saves time and improves quality of the overall labeling process.

According to one feature of the present invention, the labeling head includes a layup height sensor which allows the labeling head of the present invention to place labels onto a layup having varying heights. This feature allows more flexibility in laying out material.

According to another feature of the present invention, the labeling head includes a label sensor disposed on a bottom surface of the applicator foot to determine whether the label was transferred to the applicator foot and whether the label was applied to the layup. This feature ensures proper application of labels and alerts operator if the label was not applied. Additionally, this feature automatically reprints and reapplies a missed label.

According to a further feature of the present invention, a gap sensor determines the size of a gap between adjacent labels attached to a labels tape. This feature ensures that the labels are properly printed and eliminates error from gap inconsistency.

The foregoing and other advantages of the present invention become more apparent in light of the following detail description of the exemplary embodiments thereof, as illustrated in the accompanying drawings.

DETAILED DESCRIPTION OF THE INVENTION

Figure 1:
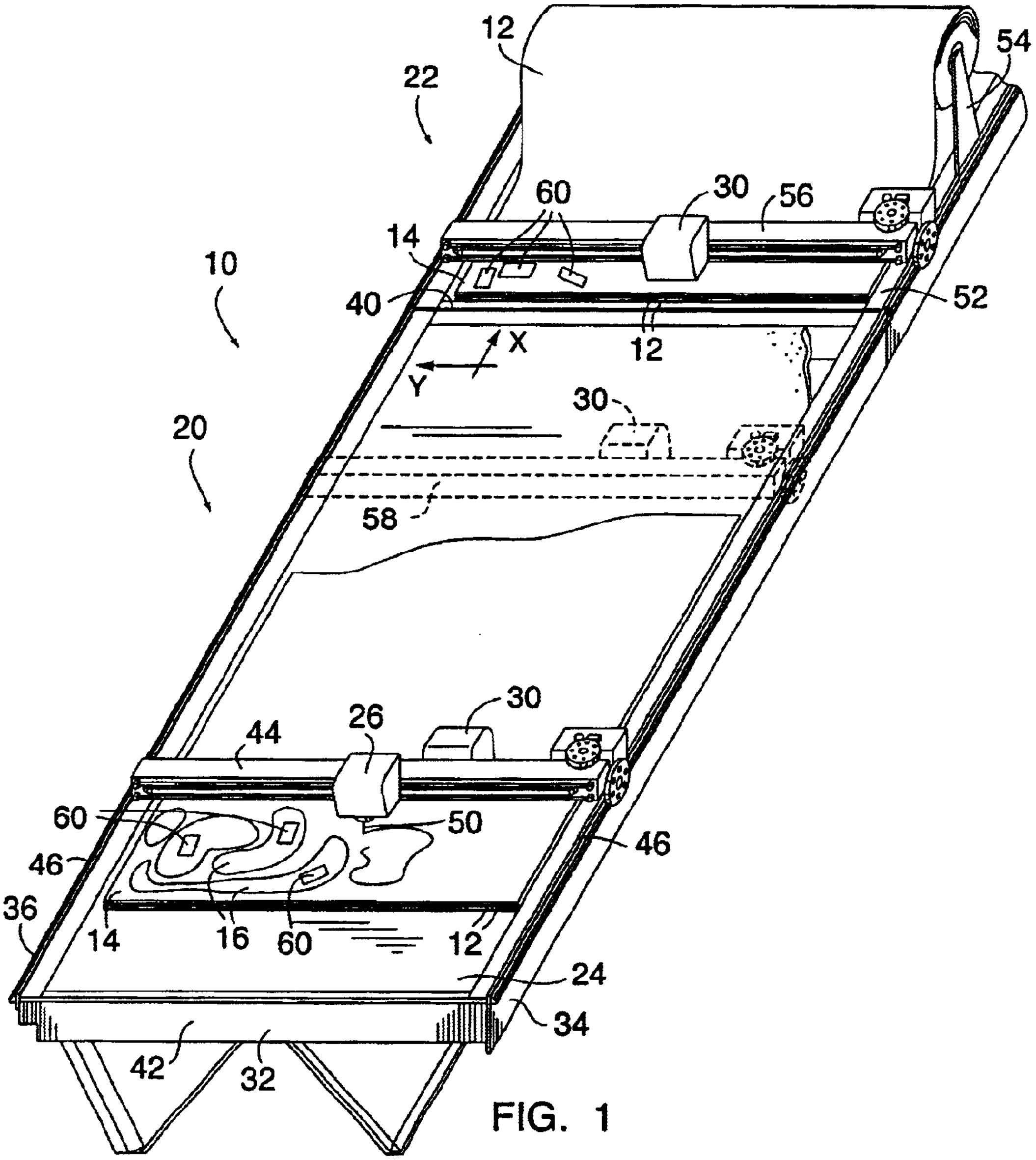
FIG. 1 is a schematic perspective view of a cutting and spreading apparatus including a labeling head placing labels on a layup of sheet material, according to the present invention.

Referring to FIG. 1, an apparatus 10 for cutting a single ply or multiple plies 12 of limp material, referred to as a layup 14, into individual parts 16 of predetermined size and shape includes a cutting apparatus 20 and a spreading apparatus 22. The cutting apparatus 20 includes a cutter table 24 for supporting the layup 14 and a cutter head 26 movable with respect to the cutter table 24. The cutting apparatus 20 also includes a labeling head 30 that is movable with respect to the cutter table 24. The cutter table 24 includes a frame 32 and extends in a lateral, or Y-coordinate, direction from a console side 34 to a remote side 36 and in a longitudinal, or X-coordinate, direction from a take on end 40 to a take off end 42.

A cutter beam 44 supports the cutter head 26 and is movable in the X-coordinate direction along a pair of guide rails 46 secured to the cutter frame 32. The cutter head 26 and the labeling head 30 move in the lateral or Y-coordinate direction across the cutter beam 44. A cutter tool 50 is supported within the cutter head 26.

Figure 2:
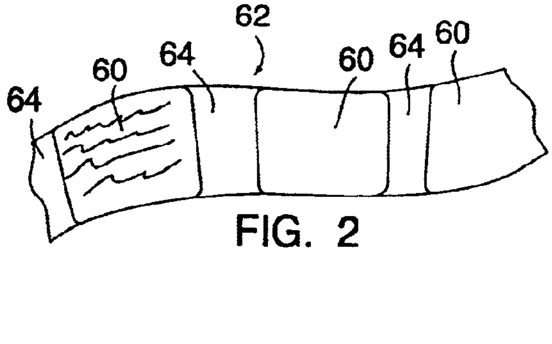
FIG. 2 is an enlarged, top view of a labels tape with a plurality of labels of FIG. 1 attached thereto and having a gap formed between adjacent labels.

The spreading apparatus 22 is disposed substantially adjacent to the cutting apparatus 20 and includes a spreader table 52 for supporting at least one layer of material 12 and a spreader 54 for facilitating spreading of the material 12. The spreader 54 includes a spreading beam 56 that is movable along the spreader table 52 in the X-coordinate direction. The labeling head 30 is secured to the spreader beam 56 and is movable along the spreader beam 56 in the Y-coordinate direction. The labeling head 30 can also be a standalone unit or be attached to a labeling head beam 58 moving along the spreader table 52 or the cutter table 24, as shown in dash lines in FIG. 1. The labeling head 30 is movably attached to the cutter beam 44, to the spreader beam 56 or the labeling head beam 58 for printing a plurality of labels 60 with the plurality of labels removably attaching onto a labels tape 62 and including a gap 64 between two adjacent labels 60, as can be seen in FIG. 2.

Figure 3:
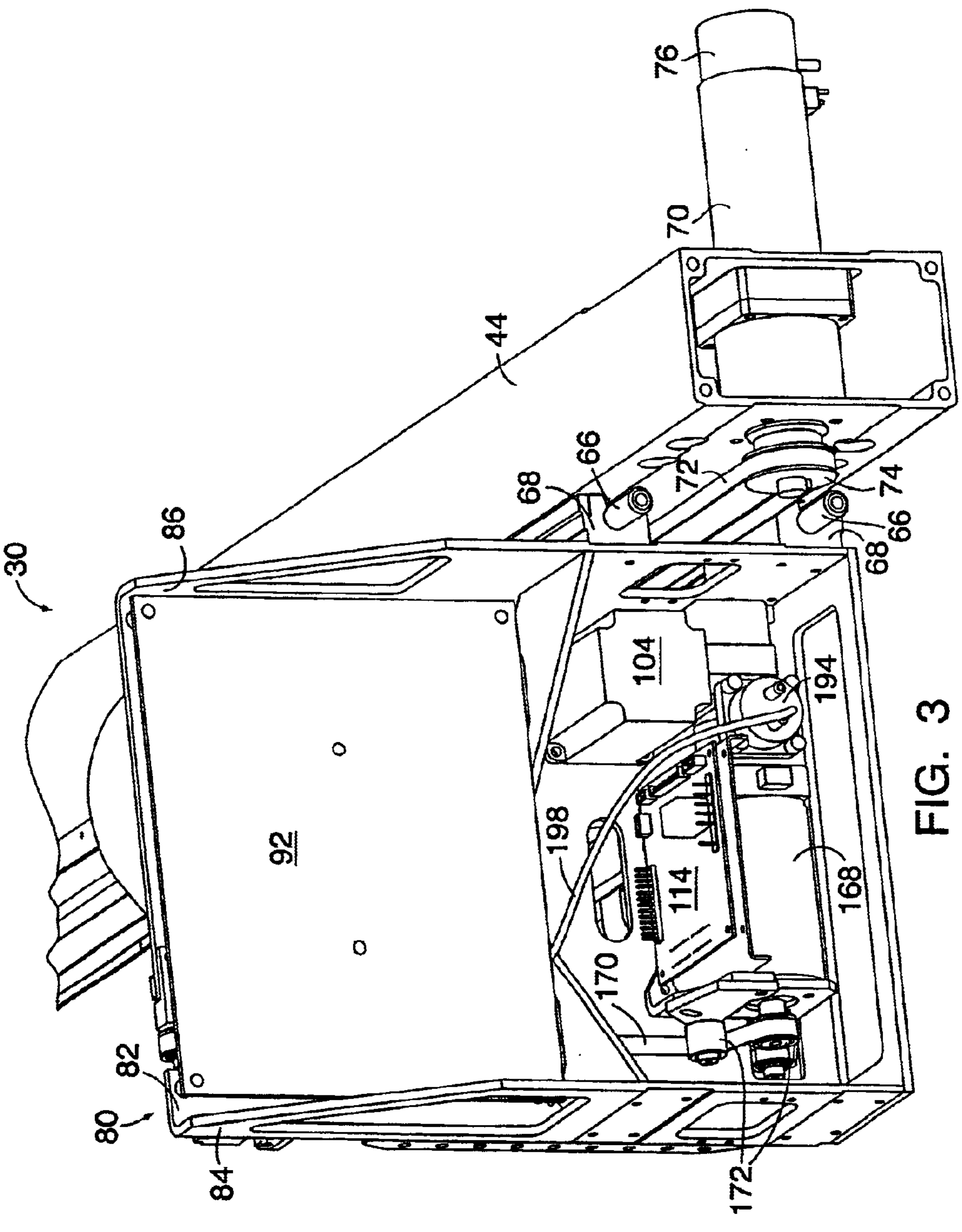
FIG. 3 is an enlarged, right side perspective view of the labeling head of FIG. 1 attached onto a beam exposing a label printing and handling assembly and an applicator foot assembly.

Referring to FIG. 3, the labeling head 30 is movably attached to the cutter or spreader beam 44, 56 by means of a plurality of guide rails 66 attached to each beam 44, 56 and a plurality of linear bearings 68 secured to the labeling head 30. A Y-axis motor 70 and a belt 72, guided by a plurality of pulleys 74, drive the labeling head 30 along the beam 44, 56 in the Y-coordinate direction. An encoder 76 is secured to the Y-axis motor 70 for determining the actual Y-coordinate position of the labeling head 30.

Figure 4:
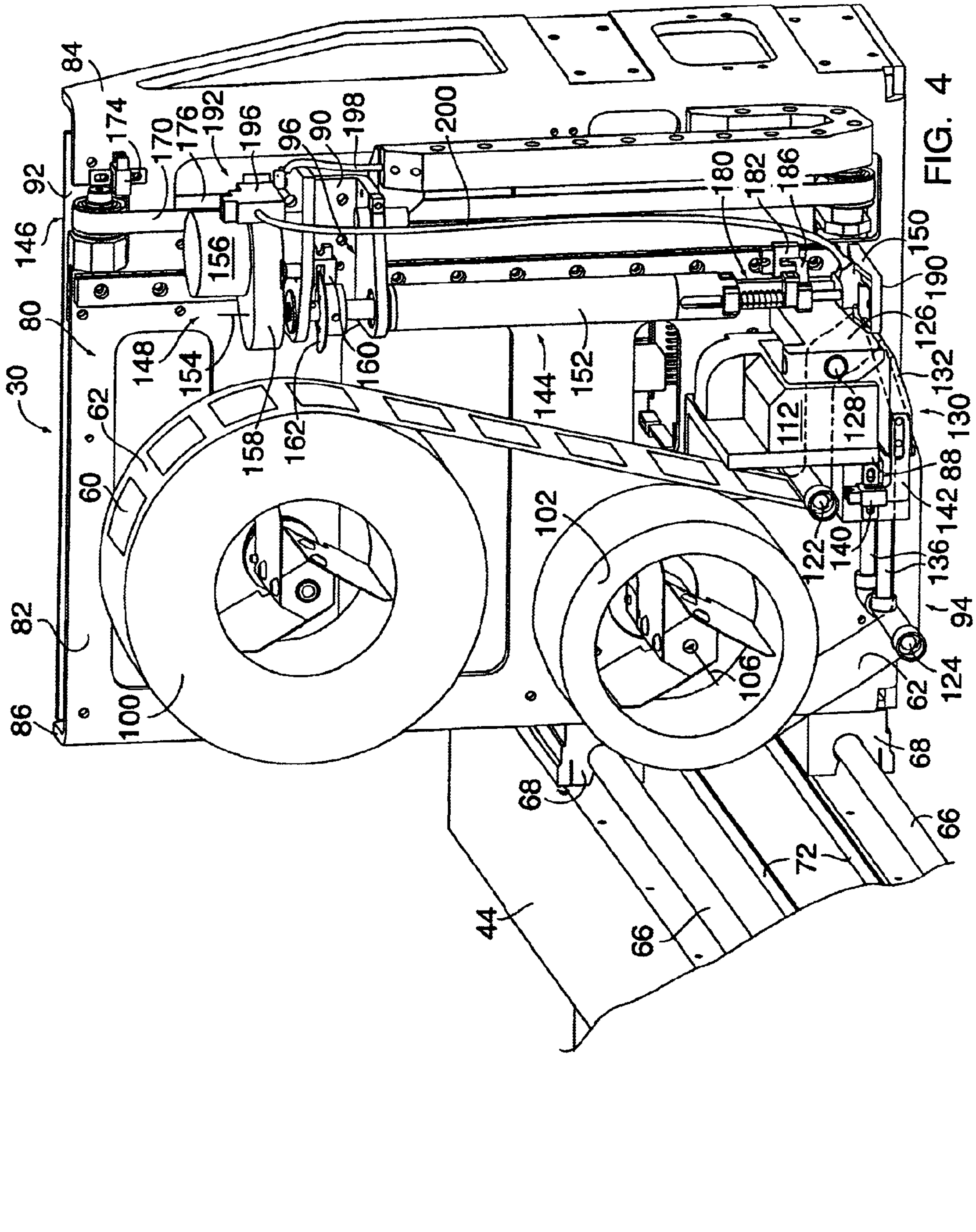
FIG. 4 is an enlarged, left side perspective view of the labeling head of FIG. 1 attached onto the beam.

Referring to FIGS. 3 and 4, the labeling head 30 is supported by a labeling head frame 80. The frame 80 has a support wall 82 flanged by a first frame side 84 and a second frame side 86. The support wall 82 has a plurality of brackets 88, 90 mounted thereto. The frame 80 supports a controller circuit board 92, a label printing and handling assembly 94, and an applicator foot assembly 96. The controller circuit board 92 is attached to the support frame 80 and communicates with all electronically driven components of the labeling head 30. The controller circuit board 92 also includes a processor (not shown) having instructions to control the labeling operations. The controller board also communicates with cutter computer and/or spreader computer, or a standalone computer (not shown).

The label printing and handling assembly 94 includes a supply roll 100 with a plurality of labels 60 removably adhered to the labels tape 62 and a take-up roll 102 for winding empty labels tape 62 and defining a paper path therebetween. The take-up roll 102 is driven in a clockwise direction by a take-up motor 104 disposed on the other side of the support wall 82, as can be seen in FIGS. 3 and 4. The take-up roll 102 rotates about a take-up roll axis 106. The supply roll assembly includes a slip clutch (not shown) to maintain tension on the supply roll.

Figure 5:
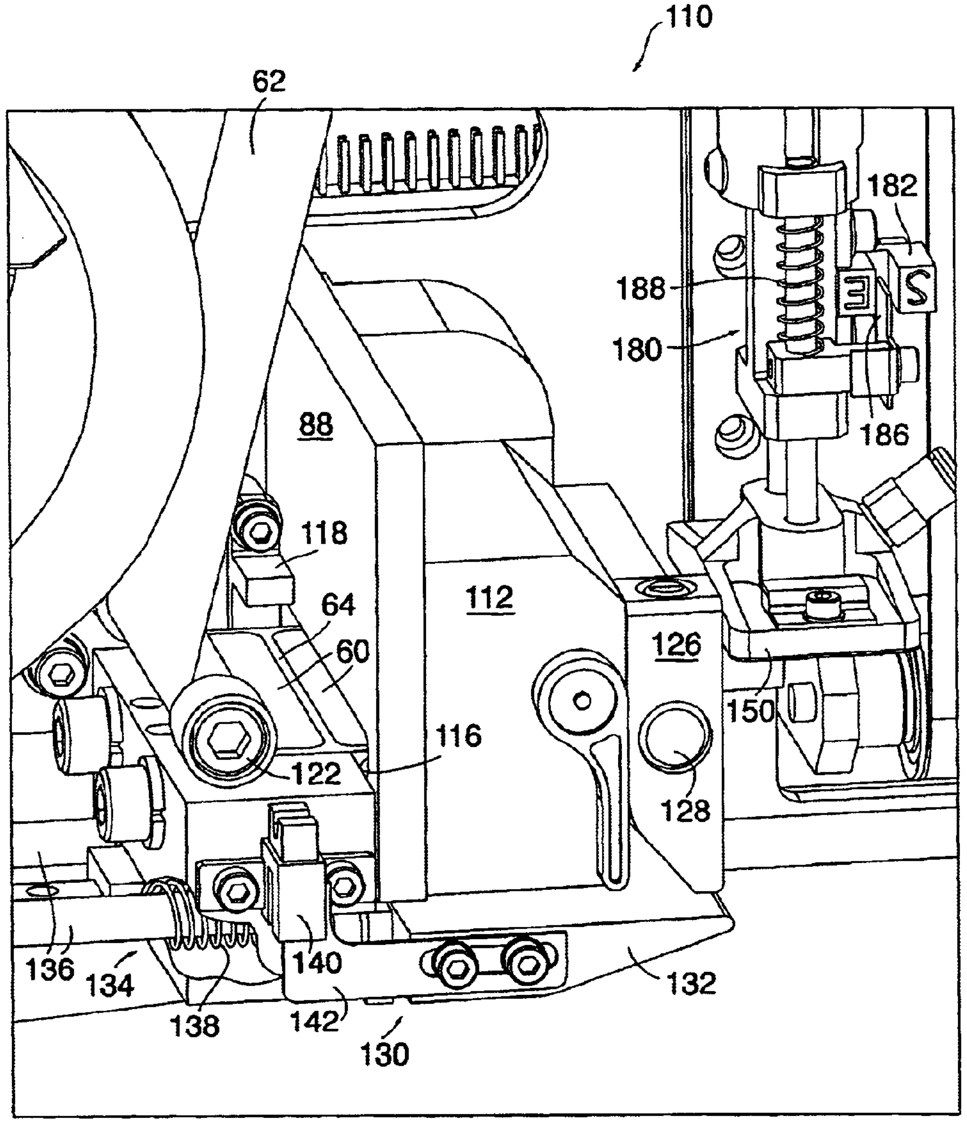
FIG. 5 is an enlarged, fragmentary, partially cut-away, perspective view of a printing unit and a movable platen of the labeling head of FIG. 4.

Referring to FIG. 5, the label printing and handling assembly 94 also includes a printing subassembly 110 having a printing unit 112 secured onto the support wall 82 of the frame 80 via the bracket 88 and a printing circuit board 114 attached to the other side of the support wall 82. The printing unit 112 includes an input opening 116 and an output opening (not shown). A label gap sensor 118 is disposed substantially adjacent to the input opening 116 of the printing unit 112 for establishing location and width of the gap 64 between the labels 60. The gap sensor 118 is a transmissive-type sensor that determines change in amount of light that passes through the labels tape with labels. The gap sensor 118 distinguishes between the gap 64 and the label 60 thereby establishing precise location of the label 60 and compensating for inconsistency in width of gap 64.

A plurality of label guides 122, 124 are attached to the support wall 82 for properly guiding the tape 62 through the label path, as best seen in FIG. 4. A movable label guide plate 126, disposed substantially adjacent to the printing unit 112, is movable along a label guide plate shaft 128 for guiding the tape 62 and for allowing to clear potential label jams.

The label printing and handling assembly 94 also includes a movable platen subassembly 130 disposed substantially adjacent the printing unit 112, as best seen in FIG. 5. The platen subassembly 130 includes a platen 132 that has a retracted position, a partially extended position, and a fully extended position. The platen 132 is actuated by a spring mechanism 134 biasing the platen 132 to move along the support wall 82 toward the first frame side 84 into the extended position. The platen 132 is shaped to receive labels tape 62 with labels 60 around a contour thereof. In the preferred embodiment of the present invention, the spring mechanism 134 includes bolts 136 and a spring 138. The platen subassembly 130 also includes a platen sensor 140 fixedly secured with respect to the support wall 82 and a flag 142 fixedly attached to the platen 132 and, therefore, movable therewith. The platen sensor 140 determines whether the platen 132 is in the retracted or extended position.

Referring back to FIG. 4, the label path starting at the supply roll 100 passes along the first label guide 122 into the printing unit 112. The label path is then defined by the label guide plate 126 and the platen 132. The path then follows the second paper guide 124 to the take-up roll 102.

The applicator foot assembly 96 includes an applicator foot subassembly 144 driven by a vertical mechanism 146 in a vertical direction and a rotating mechanism 148 actuating the applicator foot subassembly 144 angularly, as best seen in FIG. 4. The applicator foot subassembly 144 includes an applicator foot 150 secured to a foot shaft 152 having a foot rotation axis 154.

Figure 6:
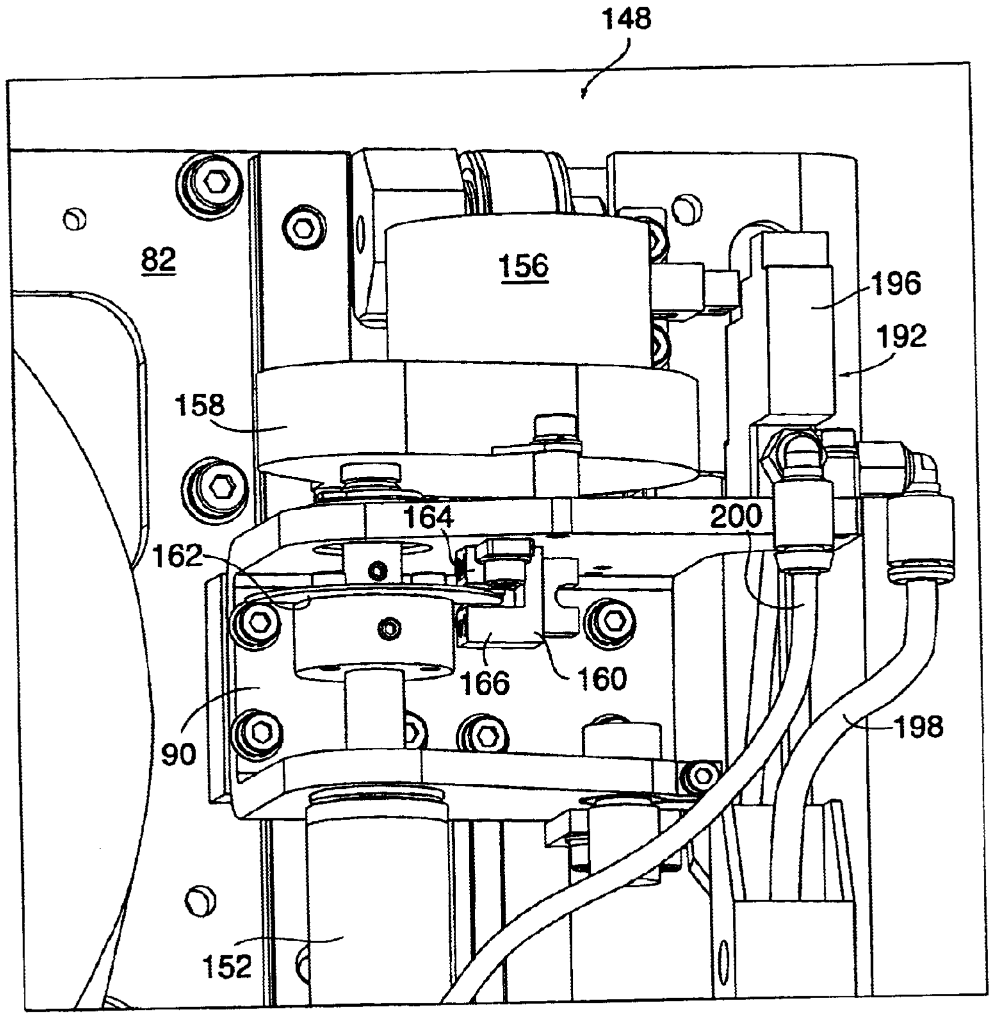
FIG. 6 is an enlarged, fragmentary, perspective view of the labeling head of FIG. 4.

Referring to FIG. 6, the foot rotating mechanism 148 includes a foot rotating motor 156 and a gearbox 158 that rotate the applicator foot 150 approximately one hundred eighty degrees (180°) total or approximately ninety degrees (90°) in either clockwise or counter-clockwise direction from its initial position. The applicator foot 150 has an initial angular position, a fully rotated clockwise position, and a fully rotated counter-clockwise position with a plurality of intermediate angular positions therebetween. The foot rotating mechanism 148 also includes a home rotary sensor 160 and a half disc 162 cooperating with the rotary sensor 160 to establish initial angular position of the foot 150 when the labeling head is powered. The rotary sensor 160 includes an emitting portion 164 and a receiving portion 166 with a beam passing from the emitting portion 164 to the receiving portion 166 and the half disc 162 either blocking the beam or allowing the beam to pass from the emitting portion 164 to the receiving portion 166 to activate the rotary sensor 160.

The applicator foot vertical mechanism 146 includes an applicator motor 168 disposed on the other side of the support wall 82, as best seen in FIG. 3, driving a belt 170 through a plurality of pulleys 172. The belt 170 is fixedly secured to the applicator foot subassembly 144 via bracket 90. The vertical mechanism 146 also includes a home vertical sensor 174 fixedly attached to the support wall 82 and a flag 176 fixedly secured to the applicator foot subassembly 144 and movable therewith, as shown in FIG. 4. The vertical sensor 174 and the flag 176 cooperate to establish initial vertical position of the applicator foot 150 when the labeling head 30 is powered. The vertical sensor 174 includes an emitting portion and a receiving portion with the flag 176 being adapted to fit therebetween.

Figure 7:
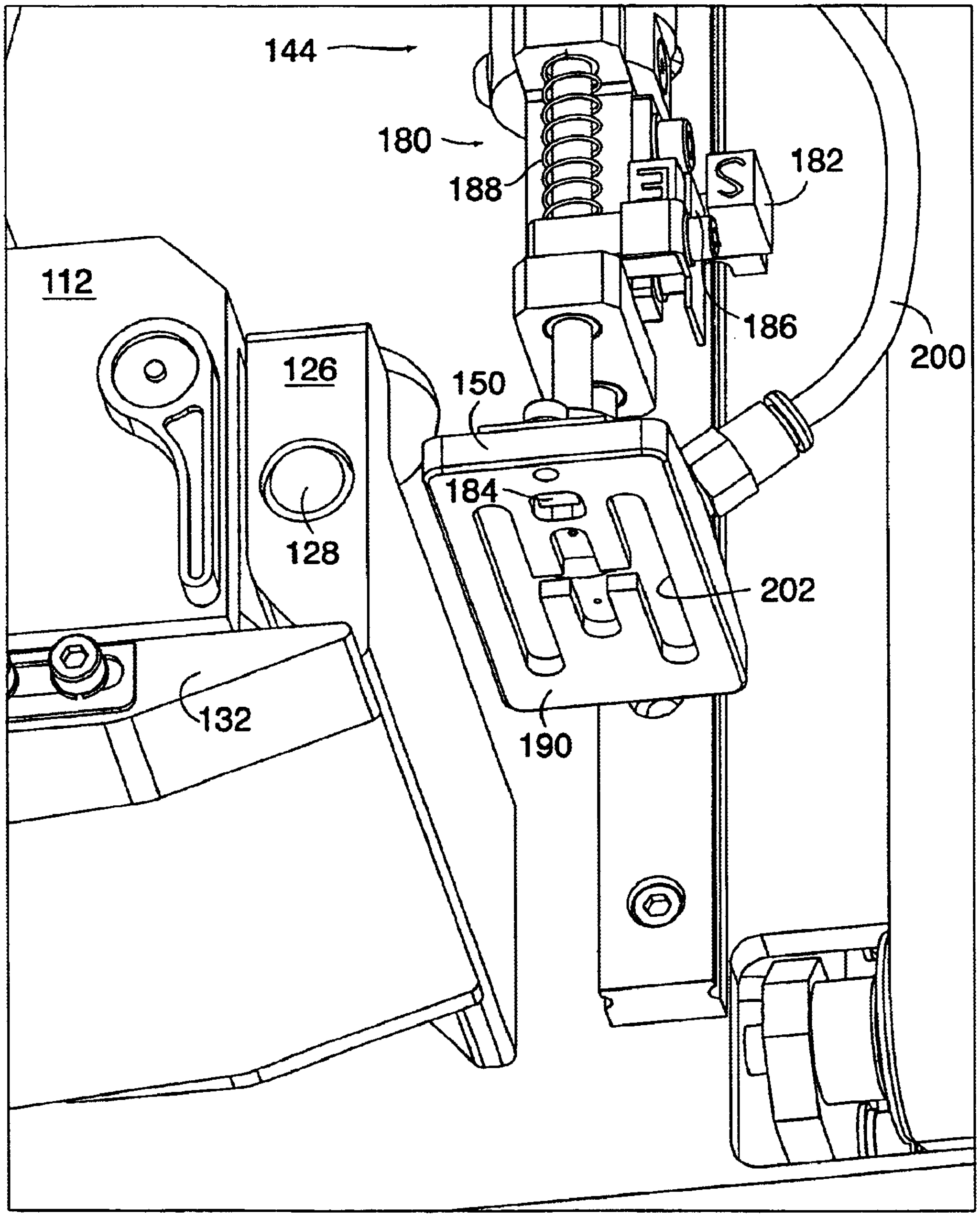
FIG. 7 is an enlarged, fragmentary, perspective view of an applicator foot of the labeling head of FIG. 4.

Referring to FIG. 7, the applicator foot subassembly 144 also includes a shock absorber mechanism 180, a layup height sensor 182, and a label sensor 184. The layup height sensor 182 is secured to the applicator foot subassembly 144 with a flag 186 cooperating with the layup height sensor 182 to determine when the applicator foot 150 comes into contact with the layup 14. In the preferred embodiment of the present invention, the shock absorber mechanism 180 includes a spring 188 for absorbing shock and for activating the layup height sensor 182 when the applicator foot 150 comes into contact with the layup 14. The label sensor 184 is disposed on a bottom surface 190 of the applicator foot 150 and is a reflective optical sensor for detecting presence or absence of the label 60 at the bottom surface 190 of the foot 150.

Figure 8:
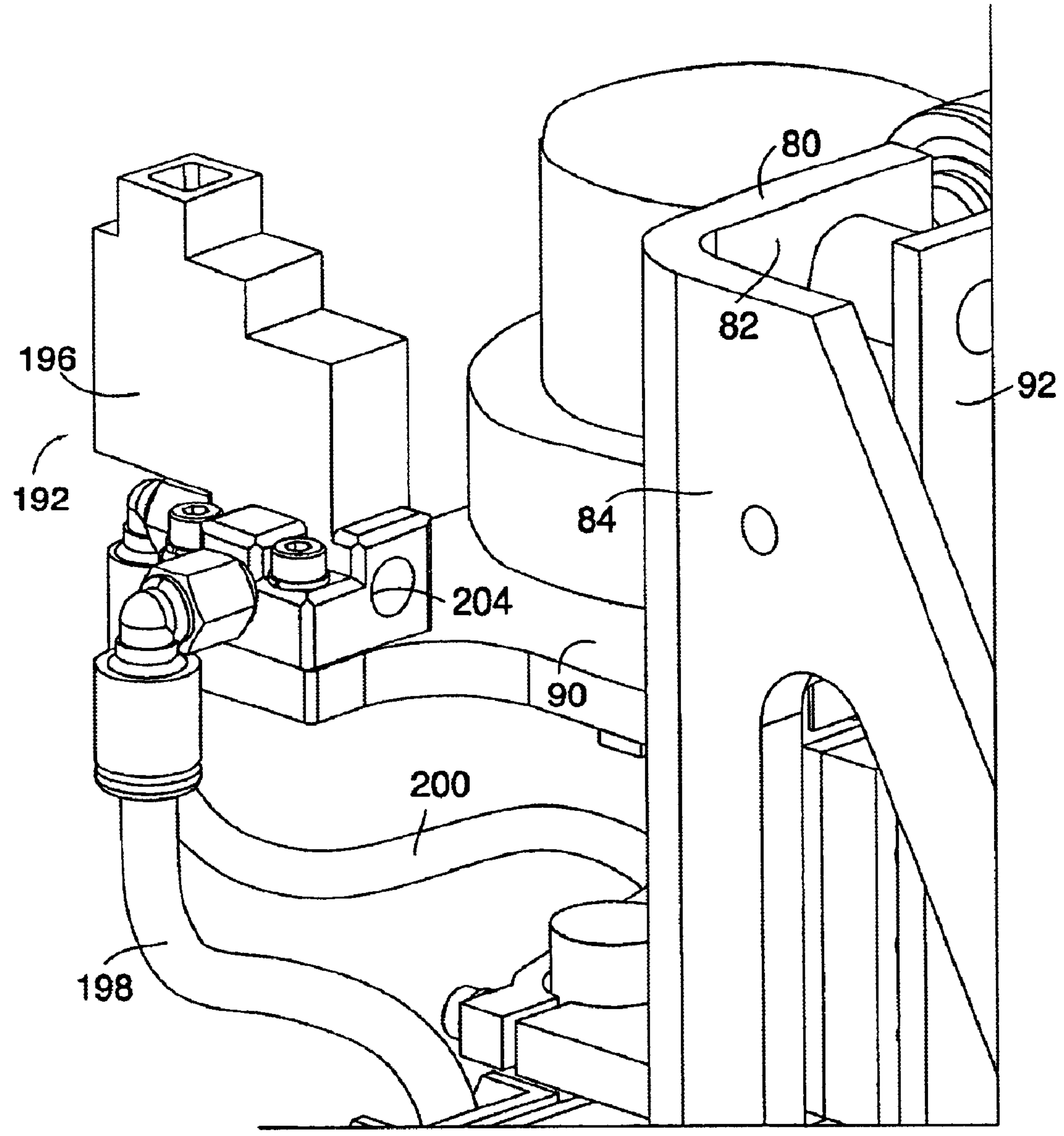
FIG. 8 is an enlarged, fragmentary, perspective view of a vacuum switch of the labeling head of FIG. 4.

Referring back to FIG. 4, the applicator foot subassembly 144 also includes a label-holding mechanism 192 which has a vacuum pump 194, as can be seen in FIG. 3. A vacuum valve 196 secured to the bracket 90, as best seen in FIGS. 6 and 8, is in fluid communication with the vacuum pump 194 by means of a first vacuum tube 198. A second vacuum tube 200 extends between the vacuum valve 196 and a foot vacuum opening 202 formed at the bottom surface 190 of the foot 150, as best seen in FIG. 7. The vacuum valve 196 also includes a valve ambient opening 204, shown in FIG. 8, and has a vacuum mode and an ambient mode. The vacuum valve 196 is electronically controlled by the controller circuit board 92 to either provide vacuum suction to the foot 150 in its vacuum mode or to vent the foot vacuum opening 202 to ambient via the valve ambient opening 204 in its ambient mode.

In operation, the material 12 is spread by the spreading apparatus 22 onto the spreader table 52, as shown in FIG. 1. In one embodiment of the present invention the labeling head 30 labels the spread material 12 in accordance with the label data. In another embodiment of the present invention, the labeling head 30 labels the material in conjunction with the cutter head 26 as the material 12 is being cut. However, in both embodiments, the labeling head 30 operates in a substantially similar manner. In the embodiment with the labeling head 30 labeling in conjunction with the cutter 20, once the cutter head 26 cuts a particular part 16 of the layup 14, the labeling head 30 is moved to that particular part 16 to label that part. In the preferred embodiment of the present invention, while the cutting head 26 is cutting the part 16, the labeling head 30 prepares the label to be applied onto the cut part 16.

Figure 9:
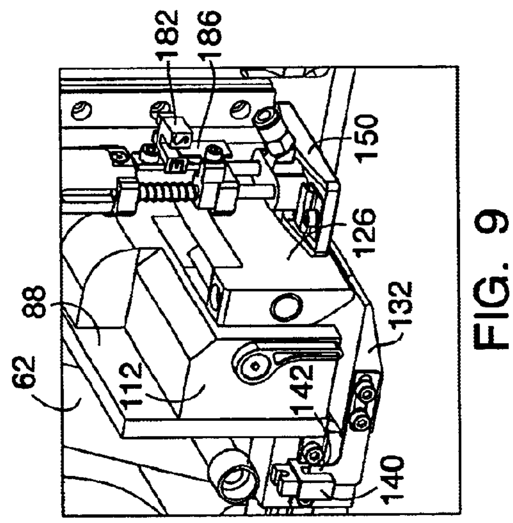
FIG. 9 is a fragmentary, perspective view of the labeling head of FIG. 4 with a movable platen in a retracted position and with an applicator foot in a raised position.

At power up of the labeling head 30 certain initialization procedures take place. For one initialization procedure, the applicator foot subassembly 144 is moved vertically upward for the flag 176 to break the beam of the home vertical sensor 174 such that the initial position of the applicator foot 150 is established, as shown in FIG. 4. Also, the applicator foot 150 is rotated until the half disc 162 and the home rotary sensor 160 cooperate to establish initial angular position of the applicator foot 150. The applicator foot 150 is then positioned in the raised and non-rotated position, as seen in FIG. 9.

Once the labeling head 30 is properly initialized, the printing unit 112 begins to print label 60. As label 60 enters the printing unit 112 through the input opening 116, the gap sensor 118 establishes precisely where the printer must begin to print. The information printed on the label 60 can vary depending on selections from the operator. For example, it is typical to print information such as part number, part name and description as well as model identification, name and size. During the actual printing, the take-up motor 104 holds position while spring loaded platen 132 extends to maintain tension on the printed label as the label passes through the printer.

Figure 10:
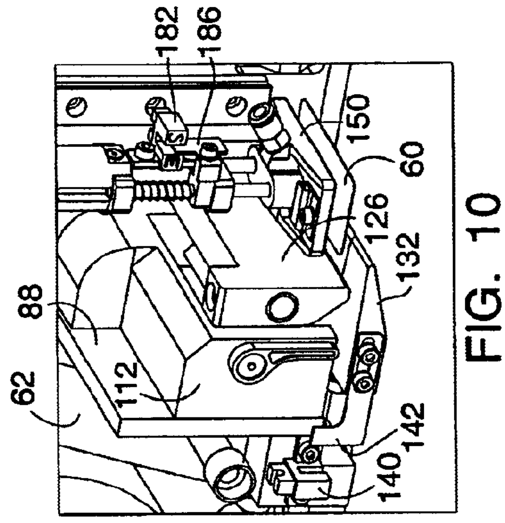
FIG. 10 is a fragmentary, perspective view of the labeling head of FIG. 9 with the movable platen in a partially deployed position and a printed label being released from a printing unit.
Figure 11:
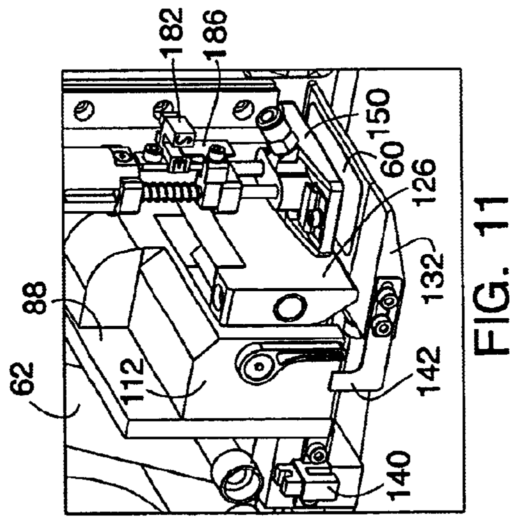
FIG. 11 is a fragmentary, perspective view of the labeling head of FIG. 10 with the platen in a fully deployed position.
Figure 12:
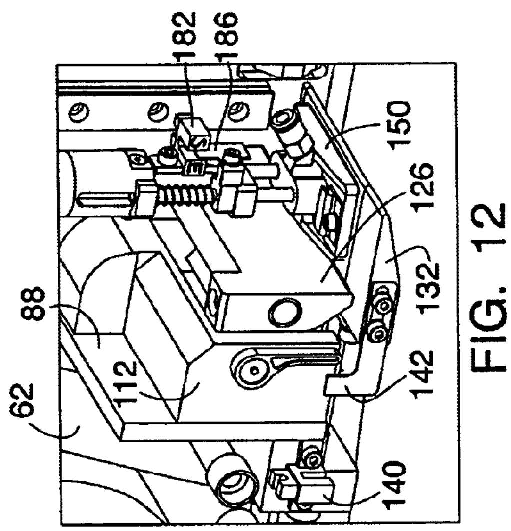
FIG. 12 is a fragmentary, perspective view of the labeling head of FIG. 11 with the platen in the fully deployed position and with the applicator foot lowered into contact with the printed label.
Figure 13:
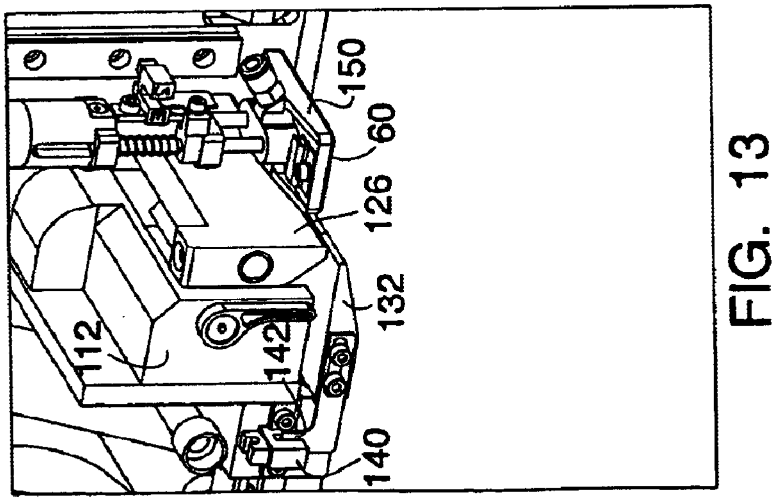
FIG. 13 is a fragmentary, perspective view of the labeling head of FIG. 12 with the platen in the retracted position.

As the first label and tape are advanced, the spring-loaded platen 132 advances toward the applicator foot 150 into a partially extended or deployed position, as shown in FIG. 10. Subsequently, rotation of the take-up motor 104 is reversed and tape 62 is slightly unwound from the take-up roll 102 to allow the platen 132 to further advance toward the applicator foot 150 into its fully extended or deployed position such that the first printed label 60 is disposed substantially underneath the bottom surface 190 of the applicator foot 150, as shown in FIG. 11. Once the first printed label 60 is disposed substantially underneath the applicator foot 150, the vacuum valve 196 is commanded to switch into vacuum mode to supply vacuum suction to the applicator foot 150. Thus, the vacuum pump 194 is working and is in fluid communication through the vacuum valve 196 and the vacuum tube 198 with the vacuum opening 202 in the applicator foot 150. As the applicator foot 150 is lowered, as best seen in FIG. 12, the vacuum holds the label 60. The label sensor 184, disposed on the bottom surface 190 of the applicator foot 150, also sends a signal to the controller circuit board 92 that the label 60 is in position on the applicator foot 150. Once the label 60 is held by the applicator foot 150, the take-up motor 104 rotates in clockwise direction to take-up the label tape 62, thereby retracting the platen 132. As the platen 132 is retracted, the label 60 is held by vacuum to the applicator foot 150 and is peeled from the tape 62 that is retracting with the platen 132, as shown in FIG. 13. As the platen 132 is fully retracted, the platen sensor 140 establishes that the platen 132 is in its retracted position.

Once the label is ready to be applied to the layup and the cutter head 26 completed cutting of the part 16, the labeling head 30 is moved to its X and Y-coordinate position. The labeling head 30 moves along either cutter or spreader beam 44, 56 in the Y-coordinate direction. The Y-axis beam motor 70 drives the labeling head 30 in the Y-coordinate direction in accordance with the command from the controller board 92 or cutter or spreader. The Y-axis encoder determines the actual position of the labeling head 30. The beam 44, 56 moves in an X-coordinate direction either along the table 24 or 52, respectively, being driven by at least one X-axis motor (not shown).

Figure 14:
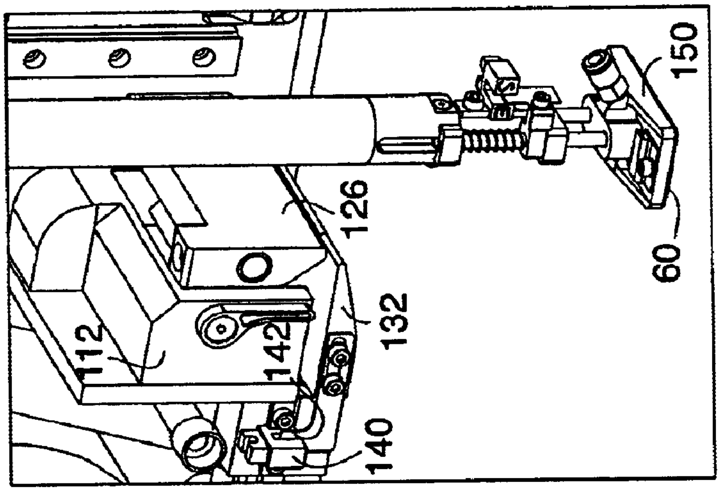
FIG. 14 is a fragmentary, perspective view of the labeling head of FIG. 13 with the applicator foot lowered into contact with the layup.
Figure 15:
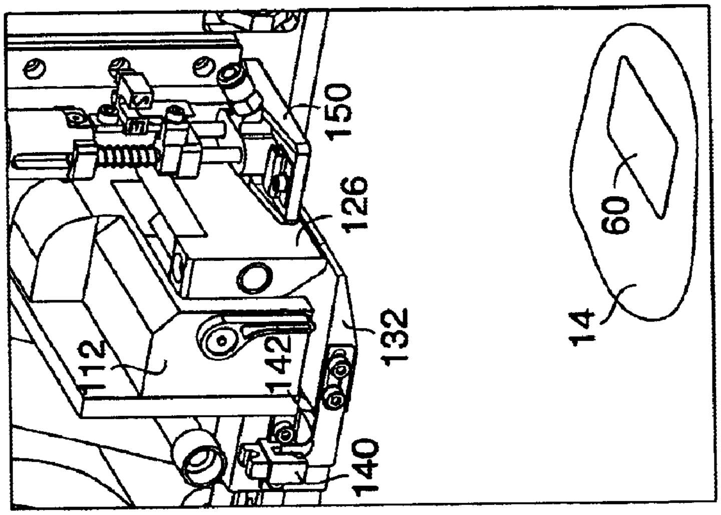
FIG. 15 is a fragmentary, perspective view of the labeling head of FIG. 14 with the label released from the applicator foot and with the applicator foot raised to accept subsequent label.

Once the labeling head 30 is properly positioned in the X and Y-coordinate directions over the table 24, 52, the controller board 92 commands the applicator foot 150 to be lowered onto the layup 14, as shown in FIG. 14. The applicator foot 150 is driven into engagement with the layup by the applicator foot motor 168 via the belt 170. The applicator foot 150 is lowered until the foot contacts the layup and the layup height sensor 182 determines that the applicator foot 150 has reached the top of the layup 14. Once the contact with the layup is made, the layup height sensor 182 sends a signal to the controller board 92 and the controller board commands the vacuum valve 196 and the applicator foot motor 168. The vacuum valve 196 is then switched into the ambient mode to vent to ambient via the valve ambient opening 204 such that no vacuum is supplied to the applicator foot 150 and the label is released from the applicator foot 150. The applicator foot motor 168 then raises the applicator foot 150 upward to receive subsequent label, as shown in FIG. 15. Once the applicator is foot is raised from the layup and the label 60, the label sensor 184 sends a command to the controller board 92 to confirm that the label 60 was in fact released. In the event of an error message, the printer reprints the missed label and reapplies the label onto the missed part. Additionally, the applicator foot 150 could be rotated by the rotating mechanism 148 for placing the label 60 at a different angle, as shown in FIG. 1. A rotating label may be advantageous for certain small parts where label does not fit otherwise or simply for reading convenience.

The labeling head of the present invention has a number of advantages over the labeling heads of the prior art. One major advantage of the labeling head of the present invention is that the labeling head 30 can be used with either a cutter 20, a spreader 22 or a standalone unit. Thus, the labeling head 30 can be mounted to the spreader beam 52 and place labels 60 onto the layup of material after the spreading operation is completed and while the material is still on the spreader table 52 waiting for the cutter 20 to complete the cutting operations on another layup. This option reduces the amount of time the layup spends on the cutter table 24 because once the layup is moved to the cutter table it is already labeled. Additionally, the labeling head of the present invention can place labels on intermediate plies 12 during the spreading operation.

Alternatively, when the labeling head 30 is mounted to the cutter beam 44, the ability of the labeling head 30 to label each part 16 after the part is cut also results in substantial time savings. The labeling head 30 of the present invention labels each part 16 when the labeling head 30 is already in the vicinity of that part, especially in the X-coordinate direction. This eliminates the need for the labeling head and the cutter beam to move across the entire cutter table in a separate labeling operation. Thus, the option of placing the labeling head 30 on the cutter beam 44 also reduces the time that the layup spends on the cutter table 24. Additionally, according to one embodiment of the present invention, the labeling head can be mounted with the cutter head and move in unison therewith. Furthermore, although the labeling head is described placing labels onto parts that were just cut, the labeling head can label part randomly to optimize the overall cutting and labeling process. Also, the labeling head can operate as a standalone unit. Therefore, all options reduce time that it takes to cut and label a layup. Additionally, the versatility of the labeling head allows each operation to optimize production and decide which option is more efficient for each particular job.

Another major advantage of the present invention is that the labeling head 30 operates in conjunction with the cutter head 26. The labeling head 30 is able to print and transfer the label to the applicator foot while the cutter head is cutting the part. The labeling head then moves to the cut part to place the prepared label onto the newly cut part. This feature of the labeling head saves a great deal of time during the cutting and labeling operation for several reasons. First, the labeling head prepares the label to be applied while the cutter head is cutting the part. Second, the cutter beam 44 is already in the vicinity of the cut part. The cutter beam does not have to travel across the entire cutter table twice, once for cutting and then later for labeling. Rather, the cutting and labeling operations are completed substantially simultaneously with the cutter beam already in the vicinity of the part to be labeled.

A further major advantage of the present invention is that the printing unit 112 is integral to the labeling head 30 and prints the labels 60 dynamically or on "as needed" basis for each part. This is a major improvement over the preprinted labels of the prior art.

Another advantage of the labeling head 30 of the present invention is that the labels can be applied to the layup having different heights. The height of the labeling can be automatically determined by the labeling head for each individual label. Thus, the layup 14 can be laid out without regard as to how many different heights it has and what the precise location of each pile is.

A further advantage of the present invention is that label sensor 184 detects presence and then absence of the label, thereby ensuring that the applicator foot 150 first picked up the label and then actually applied the label 60 onto the part 16.

An additional advantage of the present invention is that the gap sensor 118 determines the actual gap 64 between the labels 60 and, therefore, ensures that labels 60 are properly printed even when the label roll is almost exhausted. This feature eliminates the problem of partially printing labels and not fitting the printed information within the label due to gap inconsistency between the labels. Typically, the gap inconsistency aggregate error results in labels being printed not within the label, especially towards the end of the roll. The gap sensor 118 eliminates that problem.

Although a variety of different sensors, printers, and motors can be used in the labeling head 30 of the present invention, in the preferred embodiment of the present invention, the printer 112 was manufactured by Seiko and is type number LTP2242C-S432. Also, in the preferred embodiment, the sensors 140, 160, 174, 182 used were the type having an emitting portion and a receiving portion with a gap therebetween and a beam emitted by the emitting portion passing toward the receiving portion. The flag would either break beam or allow the beam to pass from the emitting portion to the receiving portion in order to activate the sensor. One type of such sensor is manufactured by Optek having a part number OPB-831W55. The label sensor 202 is manufactured by Omron having a part number EE-SY124. The gap sensor 118 is manufactured by Optek having a part number OPB-815W. The rotary motor used in the preferred embodiment of the present invention was manufactured by SAIA-BURGESS and has a part number UBB5N10D12ANNT. The take-up motor was manufactured by Eastern Air Devices and has a part number LH2331-M50A1. The applicator foot motor was manufactured by Pittman and has a part number 14233. The vacuum pump used in the preferred embodiment of the present invention was manufactured by Brailsford and has a part number TD-4/3B. The vacuum valve used in the preferred embodiment of the present invention was manufactured by SMC and has a part number VQ110-52-M5.

While the present invention has been illustrated and described with respect to a particular embodiment thereof, it should be appreciated by those of ordinary skill in the art, that various modifications to this invention may be made without departing from the spirit and scope of the present invention. For example, the labeling head can be mounted onto the beam 44, 56 from either the first frame side 82 or the second frame side. Additionally, the labels can be placed either directly onto the top layer of the material in the layup 14 or onto an overlay material placed over the layup 14. Furthermore, the labeling head 30 can be used to label the layup after the entire layup is cut into parts.

We claim:

1. A labeling head for labeling parts of a layup of sheet material by placing individual labels on said parts, said labeling head comprising:

a label printing and handling assembly for printing and handling said labels, said assembly including a printing unit for printing each said label prior to placing said label onto said layup, said layup being supported at a cutter table of a cutting apparatus; and an applicator foot assembly cooperating with said label printing and handling assembly for applying each said printed label onto said layup, said labeling head being movably attached to a spreader beam that is movable along a spreader table disposed adjacent to said cutter table.

2. The labeling head according to claim 1 further comprising:

a frame secured to a beam movable in a Y-coordinate direction along a table supporting said layup, said frame movable with respect to said beam in an X-coordinate direction, said frame supporting said applicator foot assembly and said label printing and handling assembly.

3. The labeling head according to claim 1 wherein said label printing and handling assembly further comprises:

a movable platen for providing said printed label to said applicator foot assembly, said movable platen having a retracted position, a partially deployed position and a fully deployed position, said platen being biased into said fully deployed position.

4. The labeling head according to claim 1 wherein said label printing and handling assembly further comprises:

a gap sensor for determining size of a gap between adjacent labels to ensure proper printing of said printed labels.

5. The labeling head according to claim 4 wherein said gap sensor is a transmissive sensor.

6. The labeling head according to claim 1 wherein said applicator foot assembly further comprises:

an applicator foot subassembly for applying said printed label onto said layup;

a vertical movement subassembly for moving said applicator foot subassembly in a vertical direction for accommodating layups having different heights and dynamically adjusting to the different heights of said layup; and a rotary movement subassembly for rotating said applicator foot subassembly to apply said printed labels onto said layup at various angles.

7. The labeling head according to claim 6 wherein said applicator foot subassembly comprises:

an applicator foot for holding and applying said printed label;

a shaft for supporting said applicator foot, said shaft having a shaft axis; and a label-holding mechanism for holding and then releasing said printed label onto said layup.

8. The labeling head according to claim 7 wherein said applicator foot subassembly further comprises:

a shock absorbing mechanism for absorbing shock when said applicator foot comes into contact with said layup.

9. The labeling head according to claim 7 wherein said applicator foot subassembly further comprises:

a layup height sensor for determining when said applicator foot reaches top surface of said layup to accommodate different heights of said layup.

10. The labeling head according to claim 7 wherein said label-holding mechanism comprises:

a vacuum pump for generating vacuum; and a vacuum valve switching between a vacuum mode and an ambient mode, said vacuum valve fluidly communicating with the said vacuum pump and in said vacuum mode supplying vacuum from said vacuum pump to said applicator foot for said applicator foot to hold said label and in said ambient mode said vacuum valve venting said applicator foot to ambient for said applicator foot to release said label.

11. The labeling head according to claim 7 wherein said applicator foot further comprises:

a label sensor for sensing presence and absence of said label to ensure that said label was picked up by said applicator foot and then was released by said applicator foot.

12. The labeling head according to claim 6 wherein said vertical movement subassembly comprises:

an applicator motor for driving said applicator foot subassembly in a vertical direction.

13. The labeling head according to claim 12 wherein said vertical movement subassembly further comprises:

a vertical initialization sensor for establishing initial vertical position of said applicator foot subassembly.

14. The labeling head according to claim 6 wherein said rotary movement subassembly comprises:

rotary motor rotating said applicator foot subassembly.

15. The labeling head according to claim 14 wherein said rotary motor rotates said applicator foot subassembly approximately ninety degrees (90°) in clockwise and approximately ninety degrees (90 °) in counter-clockwise direction and incrementally therebetween.

16. The labeling head according to claim 6 wherein said rotary movement subassembly further comprises:

a rotary initialization sensor for establishing initial angular position of said applicator foot subassembly.

* * * * *